Nov. 23, 1954   W. F. PANKONIN   2,695,181
STEERING TRAILER HITCH
Filed Oct. 7, 1950

Inventor
WILLARD F. PANKONIN
by Robert J. Newman
Francis W. Anderson  Attys.

United States Patent Office 2,695,181
Patented Nov. 23, 1954

2,695,181

STEERING TRAILER HITCH

Willard F. Pankonin, Gautier, Miss., assignor of one-fifth to Charles Wankat and one-fifth to Robert J. Newman, both of Brookfield, and one-fifth to Francis W. Anderson, Berkeley, Ill.

Application October 7, 1950, Serial No. 188,964

1 Claim. (Cl. 280—444)

This invention relates to improvements in a trailer hitch. More particularly it has to do with improvements in trailer hitches adapted to control the steering movements of a trailer as it is being moved by an automotive vehicle.

Trailer hitches heretofore furnished have had the serious disadvantage of providing very little, if any, control of the steering movement of the trailer. The maneuvering of a trailer through traffic, on winding roads and while parking has been a particularly hazardous job.

According to the teaching of this invention, this difficulty is overcome by the provision of a trailer hitch comprising a series of rigid pivoting links which, at all times, control the direction of movement of the trailer by positive seeering of a wheel disposed centrally under the front end of the trailer.

It is therefore an important object of this invention to provide a trailer hitch having means for positively steering the trailer so the direction of movement of the towing vehicle is changed.

Another object of this invention is to provide a trailer hitch structure in which the weight of the trailer is not supported by the rear axle of the towing vehicle.

A further object of this invention is the provision of a trailer hitch that will substantially eliminate swaying of the trailer.

A still further object is the provision of a trailer hitch which is simple in construction and can be easily removed from the towing vehicle.

Other and further features, objects, and advantages will become evident to one skilled in the art from the following detailed description taken in connection with the accompanying drawings.

Figure 1:
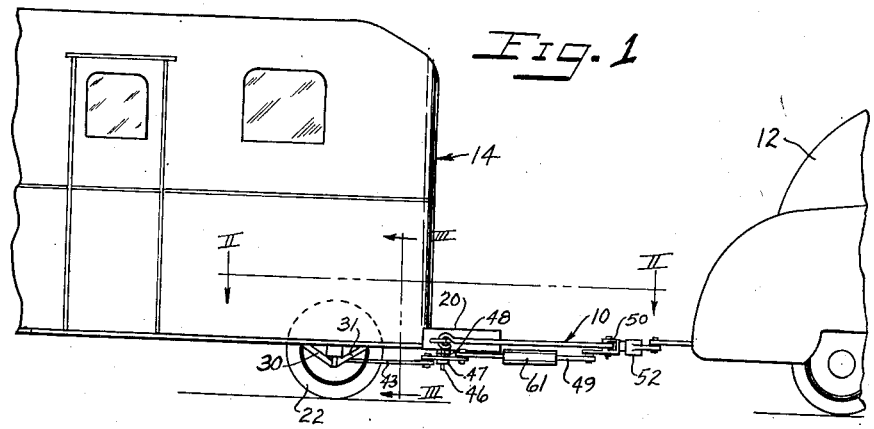
Figure 1 is a fragmentary side elevation view of a trailer and a towing vehicle connected by a trailer hitch constructed according to the teaching of the present invention.

In the drawings, the reference numeral 10 indicates generally a trailer hitch assembly connected between an automotive vehicle 12 and a trailer 14. As best seen in Figure 3, the trailer 14 has a floor or bottom structural member 15 suitably secured between two side walls 16. Frame structural members 18 extend longitudinally of the trailer, being adequately connected to the housing at several suitable places (not shown) for supporting the same and being connected at their forward end to a V-shaped structural cross member 20, Figures 1 and 2.

The entire front end of the trailer is supported by a wheel 22 which is disposed centrally under the forward end of the housing and rotatably mounted on a steering knuckle having an integral spindle 23. A king pin 24 extends through spaced arms 25 and 26 of the steering knuckle and through an elongated opening in a support member 27, thus pivotally mounting the wheel. The member 27 has a lower bifurcated end 27a which receives in pivoting engagement the converging ends of two rods 30 and 31 that have their opposite ends pivotally engaged in brackets 32 secured to a longitudinal frame member 18.

The upper end 27b of the member 27 is pivoted by means of a pin 34 to an ear 35 depending from a slanted brace 37 extending between the floor 15 and the frame member 18. The upper end 27b of the member 27 telescopes inside the hollow central portion 27c. A coil spring 38 is disposed between a collar 39 on the upper end 27b and a collar 40 on the central portion 27c tending to urge the members apart. It is to be understood, of course, that the spring 38 is strong enough to resiliently transmit the weight of the forward end of the trailer 14 to the wheel 22. Also, the pivoting arms 30 and 31 and the telescoping support member 27 permit pivoting of the wheel 22 relative to the trailer when operating over an uneven surface.

To control the steering, pivoting movement of the wheel 22 about the pin 24, a short arm 42 is integrally formed on the steering knuckle on the arm 26 and extends forwardly therefrom.

At its forward end the arm 42 is pivotally connected to a rod 43 that is also pivoted to one end of a bellcrank 45 which in turn is pivotally mounted by a stud 46 on the under surface of the V-shaped cross member 20. A nut 47 threaded on the lower end of the stud holds the bellcrank 45 in place with spacer washers 48 between the bellcrank 45 and the cross member 20.

Figure 4:
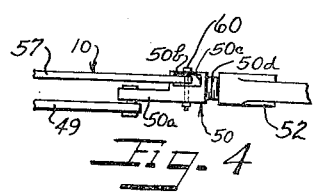
Figure 4 is an enlarged fragmentary side elevational view taken on line IV—IV of Figure 2.

A rod 49 is pivotally connected between the bellcrank 45 and the bent end 50a of a connector 50. As best seen in Figure 4, the connector 50 has a body portion 50b with a transverse aperture 50c therein and a forwardly extending threaded arm 50d. The arm 50d is engaged in a threaded opening in a yoke 52 which has ball socket end portions 53 arranged to receive the ball end of ball studs, or the like, secured to a rear structural member of the automotive vehicle 12. Lock nuts 55 and a cotter pin 56 secure the connector 50 in the yoke 52 but permit pivoting therein.

A V-shaped bar 57 is pivotally mounted at either end in brackets 58 secured to the cross member 20. At its central portion, the bar 57 passes through the opening 50c and is secured to the connector by a pivot pin 60.

It will be understood, of course, that the various pivoting connections in this trailer hitch may be of any suitable type. Further, either or both of the rods 43 and 49 may be made adjustable, as by a turnbuckle connection 61, illustrated on rod 49.

Operation

Figure 2:
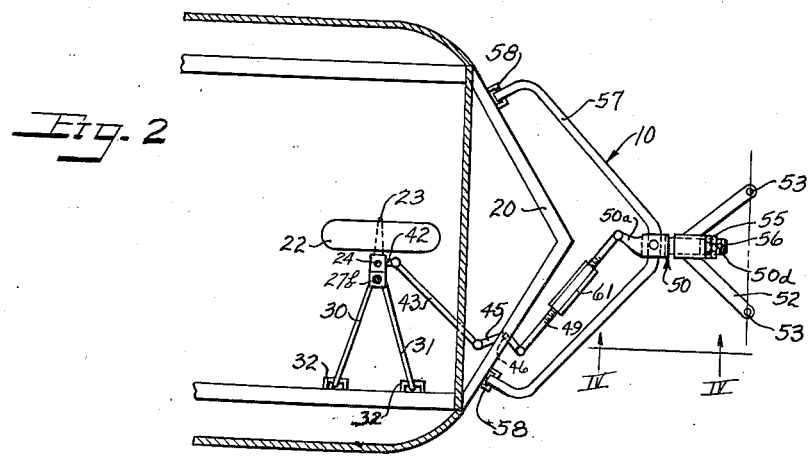
Figure 2 is a fragmentary horizontal sectional view taken on line II—II of Figure 1.
Figure 3:
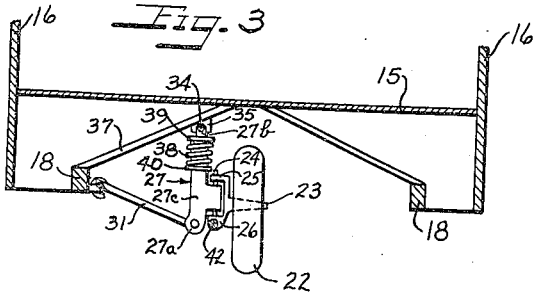
Figure 3 is a fragmentary vertical sectional view taken on line III—III of Figure 1.

Referring to Figure 2, it will be seen that, when the towing vehicle makes a right hand turn the yoke 52 and the end 50a of the connector will pivot clockwise around the pin 60 which is held in place by the bar 57. Movement of the end 50a will effect counter-clockwise pivoting of the bellcrank 45. As the bellcrank 45 is pivoted, it pulls the link 43 and causes the wheel to be pivoted in a clockwise direction about the king pin 24. Thus through this reversing leverage the wheel 22 is pivoted in the same direction as the yoke 52 which is rigidly secured to the towing vehicle.

When a left hand turn is made the pivoting action is exactly opposite to the right hand turn pivoting movement.

The fact that the end 50a is bent prevents the connector 50 from becoming aligned with the link 49, a condition which would cause the lever system to lock and jam.

The resilient mounting of the wheel 22 provides easy riding characteristics, easy steering movement of the wheel and firm support of the front end of the trailer.

An outstanding feature of the trailer hitch herein described is that it can be adjusted so that the turning radius of the trailer is the same as that of the towing vehicle. This results in less tire wear as well as diminished tire squeal when the trailer is turning. This characteristic together with the fact that substantially none of the trailer weight is supported by the towing vehicle, results in greater stability and improved riding comfort in the towing vehicle.

It will, of course, be understood that details of construction may be varied without departing from the scope of the present invention. For example, a useful modification includes an airplane type shock absorber attached at its lower end to the lower end of member 27c and attached at its upper end to brace 37.

I claim as my invention:

A device for connecting a towing vehicle to a trailer having a steerable road wheel comprising a linkage secured at one end to said vehicle and pivotally connected at the other end to said wheel and being pivotally secured at two places intermediate its ends from the frame of the trailer, and means for providing easy steering of the road wheel including a steering knuckle having an integrally formed wheel spindle, a bar pivotally mounted to the frame of the trailer and extending transversely of the trailer with a free end disposed near the long centerline of the trailer, an upright tubular support member pivotally mounting said steering knuckle and pivotally secured at the lower end to the free end of said bar, a second support member pivoted on the frame of the trailer in vertical alignment with the free end of said rod and telescopingly engaged in the upper end of said tubular support member, and a spring member disposed between said second support member and said tubular support member, said linkage being pivotally connected to said wheel through said steering knuckle.

References Cited in the file of this patent

UNITED STATES PATENTS

| Number | Name | Date |
|---|---|---|
| 1,366,765 | Byron | Jan. 25, 1921 |
| 1,412,120 | Lee | Apr. 11, 1922 |
| 1,599,420 | Klesa | Sept. 14, 1926 |
| 1,711,881 | Fornaca | May 7, 1929 |
| 1,999,748 | Baratelli | Apr. 30, 1935 |
| 2,134,351 | Arehart | Oct. 25, 1938 |
| 2,290,923 | Wahlberg | July 28, 1942 |
| 2,430,906 | Burt | Nov. 18, 1947 |

FOREIGN PATENTS

| Number | Country | Date |
|---|---|---|
| 353,501 | Italy | Oct. 19, 1937 |
| 432,135 | Germany | July 27, 1926 |